United States Patent
Zaopo et al.

(10) Patent No.: US 7,722,975 B2
(45) Date of Patent: May 25, 2010

(54) FUEL CELL AND MEMBRANE-ELECTRODE ASSEMBLY THEREOF

(75) Inventors: Antonio Zaopo, Milan (IT); Ana Berta Lopes Correira Tavares, Milan (IT); Yuri A. Dubitsky, Milan (IT)

(73) Assignee: Pirelli & C. S.p.A., Milan (IT)

( * ) Notice: Subject to any disclaimer, the term of this patent is extended or adjusted under 35 U.S.C. 154(b) by 1076 days.

(21) Appl. No.: 10/538,352

(22) PCT Filed: Dec. 13, 2002

(86) PCT No.: PCT/EP02/14246

§ 371 (c)(1),
(2), (4) Date: Apr. 14, 2006

(87) PCT Pub. No.: WO2004/055927

PCT Pub. Date: Jul. 1, 2004

(65) Prior Publication Data

US 2006/0228607 A1 Oct. 12, 2006

(51) Int. Cl.
*H01M 8/00* (2006.01)
*H01M 2/00* (2006.01)
*C08G 75/00* (2006.01)

(52) U.S. Cl. ............................. 429/34; 429/12; 528/171

(58) Field of Classification Search .................. 429/12, 429/34; 528/171
See application file for complete search history.

(56) References Cited

U.S. PATENT DOCUMENTS 5,198,525 A * 3/1993 Reuter et al. ................ 528/171
6,232,025 B1 5/2001 Srinivasan

FOREIGN PATENT DOCUMENTS

| EP | 1 138 712 A2 | 10/2001 |
|---|---|---|
| JP | 05-310941 | 11/1992 |
| JP | 05310941 A * | 11/1993 |
| WO | WO 00/15691 | 3/2000 |
| WO | WO 00/71839 A1 | 11/2000 |
| WO | WO 01/19896 A1 | 3/2001 |
| WO | WO 01/65623 A1 | 9/2001 |
| WO | WO 02/075835 A2 | 9/2002 |

OTHER PUBLICATIONS

Wang, F. et al., "Direct Polymerization of Sulfonated Poly(Arylene Ether Sulfone) Random (Statistical) Copolymers: Candidates for New Proton Exchange Membranes," Journal of membrane Science, vol. 197, No. 1-2, pp. 231-242, (2002).
Lufrano, F. et al., "Sulfonated Polysulfone Ionomer Membranes for Fuel Cells," Solid State Ionics, vol. 145, No. 1-4, pp. 47-51, (2001).
Leeson, J. A., B. et al., "Design, Fabrication, and Testing of Membrane Electrode Assemblies Containing Novel Ion Containing Copolymers," Virginia Polytechnic Institute and State University, Materials Research Institute, Department of Chemistry, (Aug. 2001).
Passalacqua, E., et al., "Nafion Content in the Catalyst Layer of Polymer Electrolyte Fuel Cells: Effects on Structure and Performance," Electrochimica Acta, vol. 46, pp. 799-805 (2001).

* cited by examiner

*Primary Examiner*—Dah-Wei D Yuan
*Assistant Examiner*—Zachary Best
(74) *Attorney, Agent, or Firm*—Finnegan, Henderson, Farabow, Garrett & Dunner, L.L.P.

(57) ABSTRACT

A fuel cell having a membrane-electrode assembly including an anode, a cathode, and a polymer electrolyte membrane interposed between the anode and the cathode, wherein the polymer electrolyte membrane is a sulfonated polysulfone polymer.

15 Claims, 2 Drawing Sheets

FUEL CELL AND MEMBRANE-ELECTRODE ASSEMBLY THEREOF

CROSS REFERENCE TO RELATED APPLICATIONS

This application is a national phase application based on PCT/EP2002/014246, filed Dec. 13, 2002, the content of which is incorporated herein by reference.

BACKGROUND OF THE INVENTION

1. Field of the Invention

The present invention relates to a fuel cell. More particularly, it relates to a fuel cell incorporating a sulfonated polysulfone membrane-electrode assembly, and to said sulfonated polysulfone electrolyte membrane-electrode assembly.

Moreover, the present invention relates to an apparatus powered by said fuel cell.

2. Description of the Related Art

Fuel cells are highly efficient electrochemical energy conversion devices that directly convert the chemical energy derived from renewable fuel into electrical energy.

Significant research and development activities have been focused on the development of proton-exchange membrane fuel cells. Proton-exchange membrane fuel cells have a polymer electrolyte membrane disposed between gas-diffusion positive electrode (cathode) and negative electrode (anode), forming the so-called membrane-electrode assembly (hereinafter referred to as "MEA").

The polymer electrolyte membrane comprises a proton-conducting polymer. Its role is to provide a means for ionic transport and for separation of the anode compartment and the cathode compartment.

Cathode and anode usually contains a metal catalyst supported by an electrically conductive material, for example, platinum (Pt) or alloys thereof, supported on finely divided carbon. Said metal catalyst is combined with a proton-conducting polymer, which can be the same or other than that of the polymer electrolyte membrane.

The gas diffusion electrodes are exposed to the respective reactant gases, the reductant gas and the oxidant gas. An electrochemical reaction occurs at each of the two junctions (three-phase boundaries) where one of the electrodes, polymer electrolyte membrane and reactant gas interface.

In the case of hydrogen fuel cells, the electrochemical reactions occurring during fuel cell operation at both electrodes (anode and cathode) are the following:

anode: $H_2 \rightarrow 2H^+ + 2e^-$;
cathode: $\frac{1}{2}O_2 + 2H^+ + 2e^- \rightarrow H_2O$;
overall: $H_2 + \frac{1}{2}O_2 \rightarrow H_2O$.

During fuel cell operations, hydrogen permeates through the anode and interacts with the metal catalyst, producing electrons and protons. The electrons are conveyed via an electrically conductive material through an external circuit to the cathode, while the protons are simultaneously transferred via an ionic route through a polymer electrolyte membrane to the cathode. Oxygen permeates to the catalyst sites of the cathode where it gains electrons and reacts with proton to form water. Consequently, the products of the proton-exchange membrane fuel cells reactions are water, electricity and heat. In the proton-exchange membrane fuel cells, current is conducted simultaneously through ionic and electronic route. Efficiency of said proton-exchange membrane fuel cells is largely dependent on their ability to minimize both ionic and electronic resistivity.

Polymer electrolyte membranes play an important role in proton-exchange membrane fuel cells. In proton-exchange membrane fuel cells, the polymer electrolyte membrane mainly has three functions: a) acting as the electrolyte providing ionic communication between the anode and the cathode; b) separating the two reactant gases (e.g., $O_2$ and $H_2$); and c) performing as electronic insulator. In other words, the polymer electrolyte membrane, while being useful as a good proton transfer membrane, should also have low permeability for the reactant gases to avoid cross-over phenomena that reduce performance of the fuel cell. This is especially important in fuel cell applications wherein the reactant gases are under pressure and the fuel cell operates at elevated temperatures. If electrons pass through the membrane, the fuel cell is fully or partially shorted out and the produced power is reduced or even annulled.

Fuel cell reactants are classified as oxidants and reductants on the basis of their electron acceptor or donor characteristics. Oxidants can include pure oxygen, oxygen-containing gases (e.g., air) and hydrogen peroxide. Reductants can include pure hydrogen, formaldehyde, ethanol, ethyl ether, methanol, ammonia and hydrazine.

Polymer electrolyte membranes are generally based on proton-conducting polymer/s having acidic functional groups attached to the polymer backbone.

At present, perfluorinated (co)polymers, such as Nafion® (Du Pont), based on perfluorosulfonic acid, are the most commonly used as proton-conducting polymer for polymer electrolyte membranes and in electrode construction. They have chemical and physical properties suitable for the demanding fuel cell conditions but this kind of membrane is expensive because of the fluorochemistry involved in the synthesis. Many studies have been carried out to provide cheaper alternatives to these membranes.

Thermoplastic polymers such as polysulfones, polyethersulphones, polyetherketones, polyimides, polybenzimidazole, have been proposed as substitutes of perfluorinated materials, provided that an acidic functional group (e.g., sulfonic acid group, carboxylic acid group and phosphoric acid group) is introduced into the structural unit. These materials met most of the specifications of the fuel cell membranes, namely high protonic conductivity, stability in oxidant and reducing environments and acidic medium, thermal stability, etc. Among the above-mentioned polymers, polysulfone is considered as very interesting due to its low cost and commercial availability.

WO 01/65623 (Commissariat Energie Atomique) discloses a process for preparation of MEA using a thermoplastic material as polymeric material for both membrane and electrodes. All examples are for sulfonated polyimide materials, no examples for sulfonated polysulfone are given although it is claimed that this process can also be used in this case. The process comprises the formation of a solution of the thermostable polymer, casting it on a support, and before complete dry the electrode is placed on the polymer film. No cell performance is shown.

WO 00/15691 (in the name of Victrex Manufacturing Ltd) discloses ion exchange polymers, particularly sulfonated polyarylethersulfones useful as ion conducting membranes of polymer electrolyte membrane fuel cells. These polymers include at least one of the following moieties:

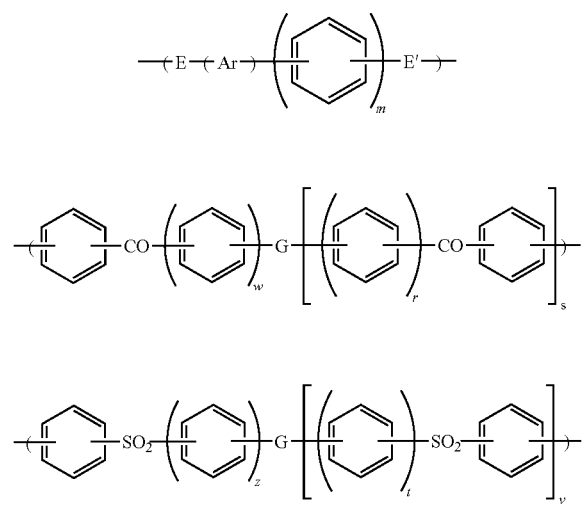

wherein G is, inter alia,

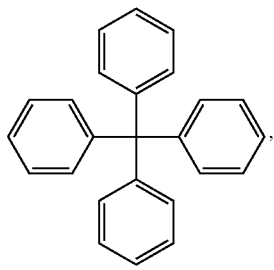

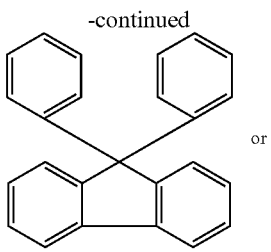

or

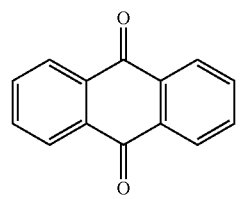

bonded via one or more of its phenyl moieties to adjacent moieties. The $T_g$ of said polymers may be at least 144° C.

WO 01/71839 (in the name of Victrex Manufacturing Ltd) discloses a method of preparing ion exchange polymeric materials, preferably sulfonated, having a formula as reported in WO 00/15691 supra, that are useful as ion conducting membranes of polymer electrolyte membrane fuel cells. Said material has at least some crystallinity or is crystallisable, WO 01/19896 (in the name of Victrex Manufacturing Ltd) discloses composite membrane for use as an ion-exchange membrane including a conductive polymer having a formula as reported in WO 00/15691 supra, preferably sulfonated. This polymer is preferably cross-linked to reduce its swellability in water.

WO 02/075835 (in the name of Victrex Manufacturing Ltd) discloses a fuel cell and the use of a polymer electrolyte, having a formula as reported in WO 00/15691 supra, which has at least some crystallinity or is crystallisable. The $T_g$ of said polymer may be at least 144° C.

As reported by Jennifer A. Leeson, Michael A. Hickner, and James E. McGrath, in the paper having title "Design, Fabrication, and testing of Membrane Electrode Assemblies Containing Novel ion Containing Copolymers", Virginia Polytechnic Institute and State University, Materials Research Institute, Department of Chemistry, Blacksburg, Va., USA (Summer Undergraduate Research Program, August 2001), attempts have been made at using sulfonated poly(arylene ether sulphone)s (BPSH-XX copolymers) of general formula

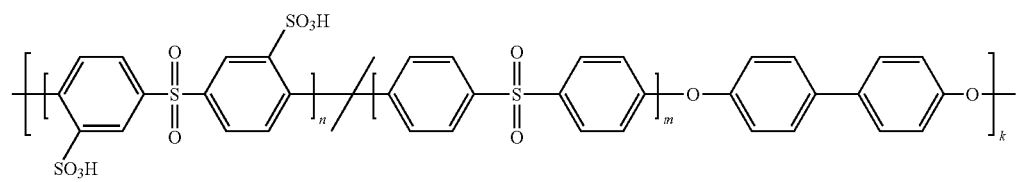

for the ion exchange membrane (proton-conducting material) with Nafion®-based electrodes. The use of different polymers for membrane and electrode causes both poor adhesion and performance problems at the membrane-electrode interface.

This paper shows a performance comparison between a MEA made with the same BPSH for electrolyte membrane and in the catalytic layer, and an all-Nafion® MEA. BPSH MEA performed comparably to Nafion® one.

Feng Wang et al., Journal of Membrane Science, 197 (2002), 231-242 discuss sulfonated poly(arylene ether sulfone) random copolymers as candidates for proton-exchange membranes to be used in fuel cells. These copolymers, therein identified as PBPSH-XX, have the same formula described by Leeson, J. A. et al., supra, with a sulfonation degree ranging between 0% and 60%.

As reported by this paper, greater ion exchange capacities (IECs) are needed with sulfonated poly(arylene ethers) to achieve similar conductivities to perfluorosulfonic acid Nafion® polymers, which is attributed to the strength of the acid group of each system. IEC is based on the quantity of acidic functional groups (e.g. $SO_3H$ groups) per dry membrane weight. Nafion® 1135 shows IEC=0.91 meq/g, highly sulfonated PBPSH-40 and PBPSH-60, described therein, have IEC of 1.72 meq/g and 2.42 meq/g, respectively.

Proper hydration of the electrolyte membrane is critical for fuel cell operation. Water uptake increases with sulfonate content due to a strong hydrophilicity of the sulfonate groups. Feng Wang et al. supra reports that the water uptake increases almost linearly from 4.4% for PBPSH-10 to 39% for PBPSH-40 and thereafter increases rapidly to 148% for PBPSH-60.

The water up-take (or water swelling) is to be sufficient for the membrane proton-conductivity, but not so high to cause excessive swelling that leads to a decrease in the membrane strength properties or a membrane deformation, as reported, inter alia, by EP-A-1 138 712 (in the name of JSR Corporation).

This patent application discloses that, although proton conductivity improves with the increasing amount of sulfonic acid groups incorporated, the incorporation of a large amount of sulfonic acid groups results in a sulfonated polymer having considerably impaired mechanical strength properties. Sulfonated polyarylene copolymers with an IEC ranging between 1.5 and 3.5 meq/g are disclosed as satisfactorily performing in hot water, even if comparative compounds having an IEC of about 3 meq/g proved not to retain the membrane shape in hot water. None of the exemplified polymers is a polysulfone.

In addition to IEC and water uptake (WU), glass transition temperature ($T_g$) of the proton-conducting polymer is of importance in a proton-exchange membrane fuel cell.

MEA are prepared by pressing the electrodes on the polymer electrolyte membrane, normally at a temperature slightly higher than glass transition temperature of the proton-conducting polymer. For example, for all based Nafion® MEAs this temperature is around 130° C. (E. Passalacqua, et al., Electrochimica Acta, 2001, 799).

It is advantageous to work with polymers with low glass transition temperature not only because of their better workability, but also in view of desulfonating process likely to occur, especially at temperatures of about 230-250° C., as from F. Lufrano et al., Solid State ionics, 145 (2001), 47-51.

The lower the glass transition temperature is, the lower the temperature required for pressing the electrodes against the membrane will be. In this way it is avoided a possible degradation of the sulfonic group, being the most sensitive part of the polymer structure.

Also, low $T_g$ values also correspond to higher solubility in solvents, which entails a higher workability.

Sulfonated poly(arylene ether sulphone)s PBPSH-40, PBPSH-50 and PBPSH-60 described by Feng Wang et al., supra, show $T_g$ higher than 270° C. Such $T_g$ values make difficult to use them for assembling a MEA.

Summarizing, it is important for the good performance of proton-exchange membrane fuel cells based on a sulfonated polymer having a degree of sulfonation sufficient to provide high ion exchange capacity (IEC), but not yielding an excessive water uptake (WU). Also, the glass transition temperature ($T_g$) should be considered for having a proper workability of the polymer in the MEA and a good stability thereof.

SUMMARY OF THE INVENTION

Applicant perceived that the problem of balancing the different features necessary to a sulfonated proton-conducting polymer for fulfilling the requirements of a proton exchange membrane fuel cell could be solved by using as proton-conducting polymer a sulfonated polysulfone polymer as described hereinbelow.

Applicant found that sulfonated polysulfone polymers as defined hereinbelow, show improved combination of properties, particularly ion-exchange capacity, water uptake and glass transition temperature.

Therefore the present invention relates to a fuel cell comprising a membrane-electrode assembly including:
(a) an anode;
(b) a cathode; and
(c) a polymer electrolyte membrane interposed between the anode and the cathode, wherein said polymer electrolyte membrane comprises a sulfonated polysulfone polymer having the following repeating units:

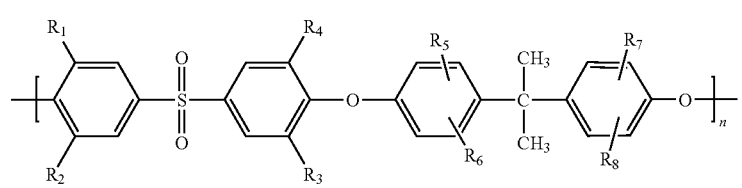

(I)

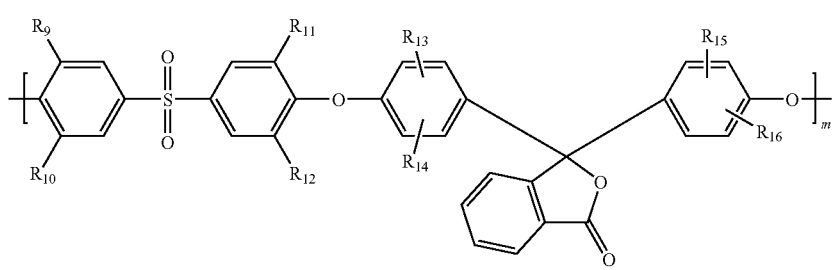

wherein $R_1$-$R_{16}$ are independently hydrogen, a $SO_3H$ group, a methyl group, an ethyl group or an optionally branched ($C_{3-6}$)alkyl group, with the proviso that at least one of $R_1$-$R_{16}$ is a $SO_3H$ group;

n+m ranges between 10 and 1,000 included;

n ranges between 0 and 999 included; and m ranges between 1 and 1,000 included, and salts thereof.

Preferably, at least one of $R1_3$-$R_{16}$ is a $SO_3H$ group.
Preferably, $R_1$-$R_4$ and $R_9$-$R_{12}$ is hydrogen.
Preferably, at least one of $R_5$-$R_8$ and $R_{13}$-$R_{16}$ is $SO_3H$.
Preferably, the polymer electrolyte membrane of the present invention comprises on a sulfonated polysulfone polymer having the following repeating units Preferably catode and/or anode of the fuel cell according to the invention comprises a sulfonated polysulfone. More preferably, said sulfonated polysulfone polymer is a polymer according to the invention.

According to a preferred embodiment, said fuel cell is a hydrogen fuel cell.

Another object of the present invention relates to a membrane electrode assembly including:

(a) an anode;
(b) a cathode; and
(c) a polymer electrolyte membrane interposed between the anode and the cathode, wherein said polymer electrolyte membrane comprises a sulfonated polysulfone polymer having the repeating units disclosed above.

According to a further aspect, the present invention relates to an apparatus powered by the fuel cell above disclosed. Said

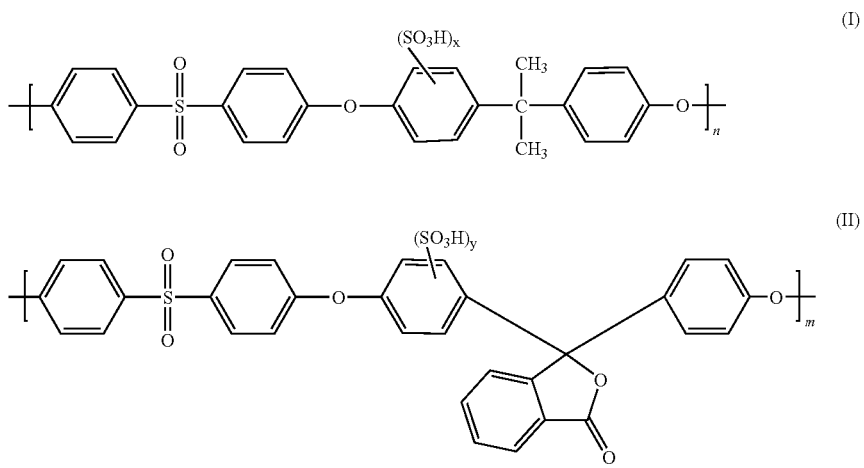

wherein x+y is 1 and n=m.

A polymer according to the invention has a sulfonic group content (ion exchange capacity) of about 0.5-3.5 meq/g, preferably of about 0.7-2.3 meq/g, more preferably of about 0.8-1.3 meq/g.

Preferably, the polymer of the invention is substantially amorphous.

The polymer of the invention can be a random or block copolymer.

apparatus may be an engine for vehicle transportation or, alternatively, an electronic portable device such as, for example, a mobile phone, a laptop computer, a radio, a camcorder, a remote controller.

Aromatic polyether sulfone polymers containing a phenolphthalein moiety are known in the art, see for example JP 05-310941 (in the name of Toray Ind. Inc.). Sulfonation of such polymers may be effected by known methods. See, for example, Feng Wang et al. supra, and the references incorporated therein.

Electrolyte membrane and electrode of the invention are prepared by casting solution of the sulfonated polysulfone in DMA/CCl$_4$ (DMA=N,N-dimethyl-acetamide).

BRIEF DESCRIPTION OF THE DRAWINGS

The present invention is now further illustrated with reference to the following attached figures.

DETAILED DESCRIPTION OF THE INVENTION

Figure 1:
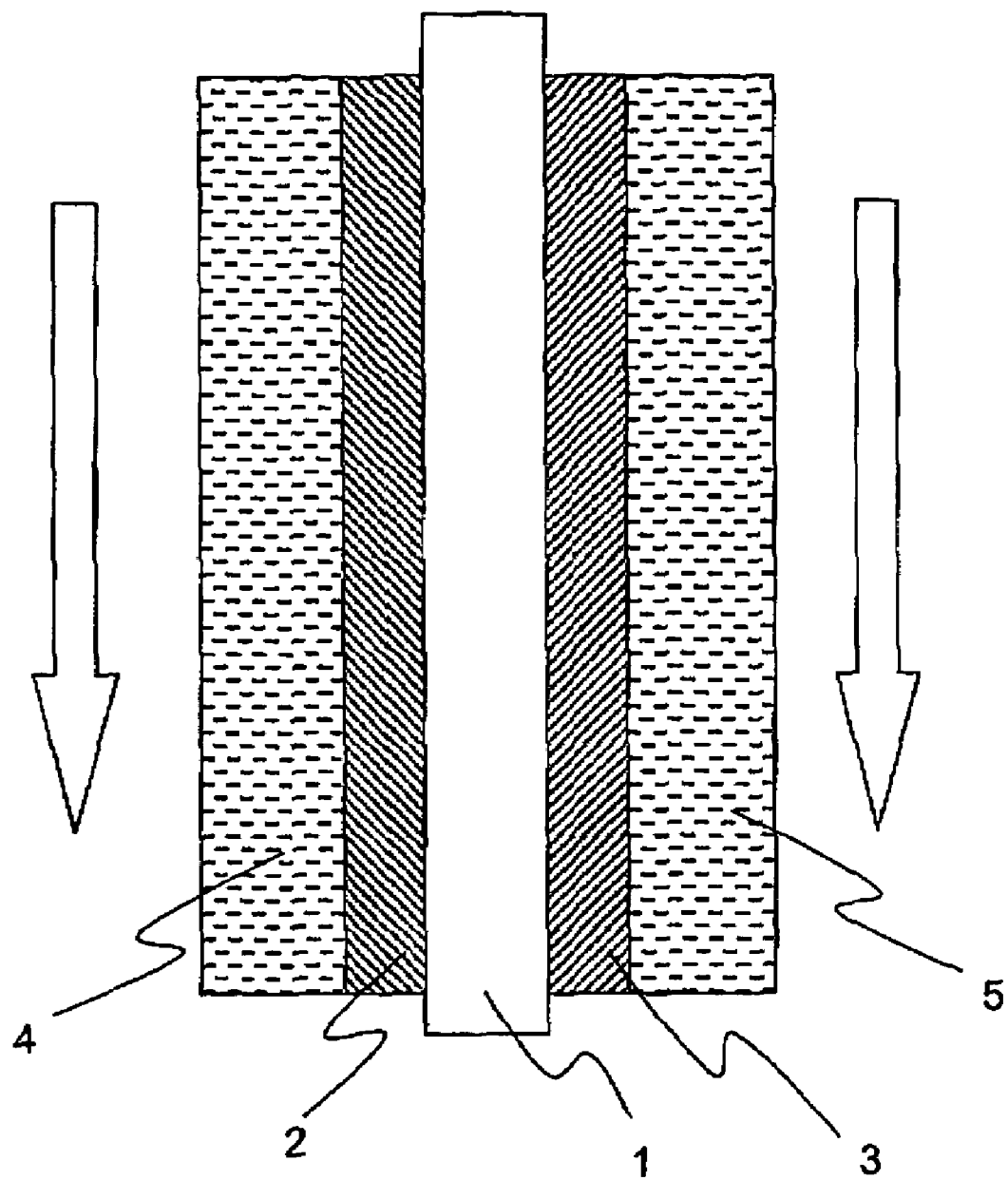
FIG. 1 is a schematic representation of a fuel cell.

FIG. 1 schematically depicts the structure of a fuel cell with a polymer membrane-electrode assembly (MEA). A polymer electrolyte membrane 1 is sandwiched between an anode 2 and a cathode 3, and gas diffusion layers 4 and 5 are formed on the outside of the anode 2 and cathode 3, respectively. On the anode side, hydrogen ions and electrons are produced by the catalyst constituting the anode 2 from a hydrogen gas fed to the anode 2 through the gas diffusion layer 4, and the resulting protons pass through the polymer electrolyte membrane 1 and form water by reacting with an oxygen gas fed to the cathode 3 via the gas diffusion layer 5 on the side of the cathode 3 and with electrons fed to the cathode 3 through outside circuitry.

Anode 2 and cathode 3 preferably comprises a catalyst capable of promoting the necessary electrode reactions. The composition of the catalyst used in the anode and cathode may comprises platinum (Pt) or alloys thereof, supported on finely divided carbon. Preferably, the catalyst is dispersed in a polymeric matrix comprising the polymer of the invention.

The gas diffusion layers 4 and 5 are composed of a material having electric conductivity and gas permeability, such as carbon paper, woven fabric, nonwoven fabric, or another material consisting of carbon fibers.

An all-based sulfonated polysulfone fuel cell was prepared and tested in H$_2$/air fuel cell at 30° C., as illustrated in the following of the description.

The proton-conducting polymer used in the preparation of the MEA of this fuel cell (as electrolyte membrane and in electrodes) was a sulfonated polysulfone (hereinafter referred to as "SPS") of formula

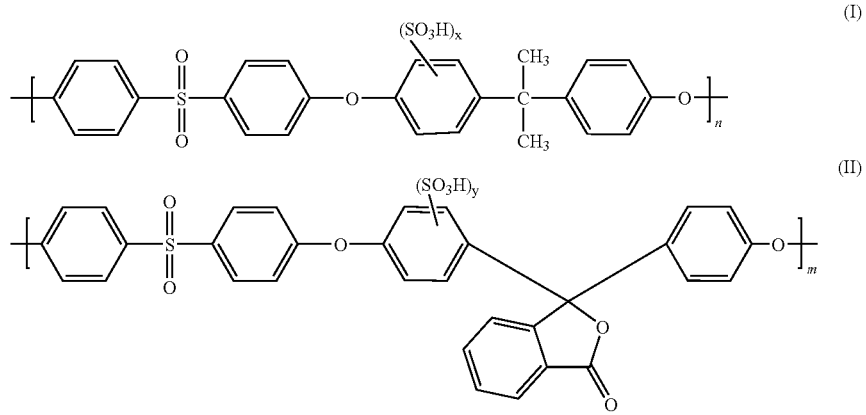

wherein x+y is 1 and n=m.

This product is marketed by Joint Stock Company "NPO Chemplast" (Moscow, Russia).

The IR spectra was recorded with AutoImage Spectrum 1 instrument, and the presence of the lactone containing monomer (C=O stretching 1750 cm$^{-1}$; CO—O stretching 1250 and 1050 cm$^{-1}$) was confirmed.

Example 1

SPS Membrane Characterization

Determination of T$_g$, Water Uptake (WU) Ion Exchange Capacity (IEC)

a) Differential Scanning Caloremitry (DSC)

The glass transition temperature (T$_g$) was measured with a Mettler Toledo star System differential scanning calorimeter under N$_2$ flow and in static air. Scans were conducted at a heating rate of 10° C./min from −20° C. to 240° C. The T$_g$ values were reported as the change in the midpoint in the slope of the baseline of the scan.

b) Ionic Exchange Capacity

A 120 µm SPS membrane sample (10 cm$^2$) was first activated in H$_2$SO$_4$ at room temperature for 18 hours, then washed with hot distilled water (50-60° C.) and then dried in a vacuum oven at 80° C. for 2 hours. The weight of the membrane was then determined (m$_{dry}$). After the membrane was immersed in 20 ml of 1M NaCl for 18 hours at room temperature in order to exchange of H$^+$ ions from the polymer with Na$^+$ ions present in the solution, the solution containing the membrane was titrated with a 0.01M NaOH solution, monitoring pH during the titration.

Plotting the pH as function of the NaOH added volume, the equivalent volume (V$_{eq}$) was determined and the IEC calculated according to the equation:

$$IEC = \frac{V_{eq} \cdot [\text{NaOH}]}{m_{dry}}$$

c) Water Uptake (WU) Determination

Another H$_2$SO$_4$ activated 120 µm SPS sample (10 cm$^2$) was immersed in 10 ml of distilled water for 24 hours at room temperature. The sample was then removed from water, the excess of water was eliminated using a filter paper, and the membrane was weighted (m$_{wet}$). The sample was then dried in a vacuum oven at 80° C. for 2 hours, and its weight was determined (m$_{dry}$). The amount of water adsorbed by the membrane over its dry weight (WU) is then calculated using the following formula:

$$WU = \frac{m_{wet} - m_{dry}}{m_{dry}} \times 100$$

Table 1 summarizes the result of the SPS membrane evaluation and the corresponding values of compounds according to Feng Wang et al. supra.

TABLE 1

| Membrane | IEC (meq/g) | WU (%) | $T_g$ (° C.) |
|---|---|---|---|
| SPS | 1.13 | 44 | 136 |
| PBPSH-40 | 1.72 | 39 | 271 |
| PBPSH-60 | 2.42 | 148 | 283, 314 |

The prior art compounds show higher IEC then the compound according to the invention, but their $T_g$ are too high for a good workability. Also, PBPSH-60 has a WU value indicating a swelling impairing its mechanical strength and shape.

Example 2

SPS-Based MEA and its Performance in $H_2$/Air Fuel Cell a) MEA Configuration
SPS electrolyte membrane
SPS-containing electrodes formed by:
diffusion layer;
catalytic layer deposited onto the diffusion layer and formed by:
supported catalyst
pore former
SPS (proton-exchange polymer)

b) Electrodes Preparation

The electrodes consisted of a composite structure formed by a diffusion layer and a catalytic layer, sprayed on a carbon wet-proof carbon paper (Toray TGPH090) of 0.3 mm thickness.

The diffusion layer was prepared by spraying a carbon (Vulcan XC-72) containing 40 wt % (dry) of polytetrafluoroethylene (PTFE, Aldrich) mixture onto the carbon paper support and heat-treated at 350° C. The carbon final loading was 2 mg/cm².

The catalytic layers either of cathode and anode were formed spraying of catalyst ink on to the diffusion layer.

The catalyst ink was prepared by mixing a SPS dispersion, glycerol and 20 wt % Pt/Vulcan XC-72 (E-TEK).

SPS dispersion was prepared by dropwise mixing 5 ml of a isopropanol-deionized water 1:1 mixture with 10 ml of 15% SPS solution in dimethyl-acetamide under vigorous stirring, until homogeneous dispersion was formed.

Catalyst/SPS ratio was 3:1 (wt % dry) and the SPS dispersion/glycerol ratio of 1:1 (wt % dry). The obtained dispersion was then treated with ultrasounds for 20 minutes.

The catalytic layers of cathode and anode were deposited by spraying of catalyst ink onto the diffusion layer. The electrodes thus obtained were dried at 160° C. in a vacuum oven for 1 hour. The oven temperature was slowly increased from 50° C. to 160° C. at heating rate of 5° C./min. Pt content was maintained constant at about 0.1 mg/cm² for both the electrodes.

c) MEA Construction

A MEA was prepared using the electrode configuration of step b) for both anode and cathode, and 120 μm thick SPS electrolyte membrane.

The membrane was preliminary activated by treatment with 200 ml of 30 wt % sulfuric acid for 18 hours, followed by three washings with deionised water and drying under vacuum at 80° C. for 6 hours.

The MEA was assembled by hot pressing the electrodes and the SPS electrolyte membrane at 130° C. for 30 min by applying a 50 Kg/cm² pressure.

The geometrical electrode area of the electrode/membrane assembly was 5 cm².

d) Electrochemical Characterization in $H_2$/Air Cell

The single cell test apparatus was purchased from Globe Tech Inc. It was composed of two copper current collector end plates and two graphite plates containing rib-channel patterns allowing the passage of humidified hydrogen to the anode and humidified air to the cathode. The single cell was connected to an HP impedance bridge and operated at between 30° C. and 70° C. at atmospheric pressure for both anode and cathode. The hydrogen and air humidifiers were maintained at a temperature of 10° C. and 5° C. higher than that of the cell, respectively.

After inserting the MEA into the single cell test housing, the cell was equilibrated with the humidified gases.

Two types of experiments were performed: cell resistance measurements at open circuit, and polarization curves (cell potential vs current density).

Cell resistance was measured at the fixed frequency of 1 kHz and under open circuit by the impedance bridge (HP) at various temperatures. The polarization curves were recorded with a program using an electronic load interfaced with a personal computer.

After obtaining a constant value of resistance, the cell was warmed up to 70° C. in a step-way and resistance measurements and polarization curves were collected at various temperatures. A further collection of resistance data was made after a few days. The data were reproducible.

The cell resistance was measure at open circuit conditions and the recorder areal resistance value, as well open circuit voltage (OCV) are set forth in table 2. A remarkable OCV value was measured together with a low cell resistance.

Figure 2:
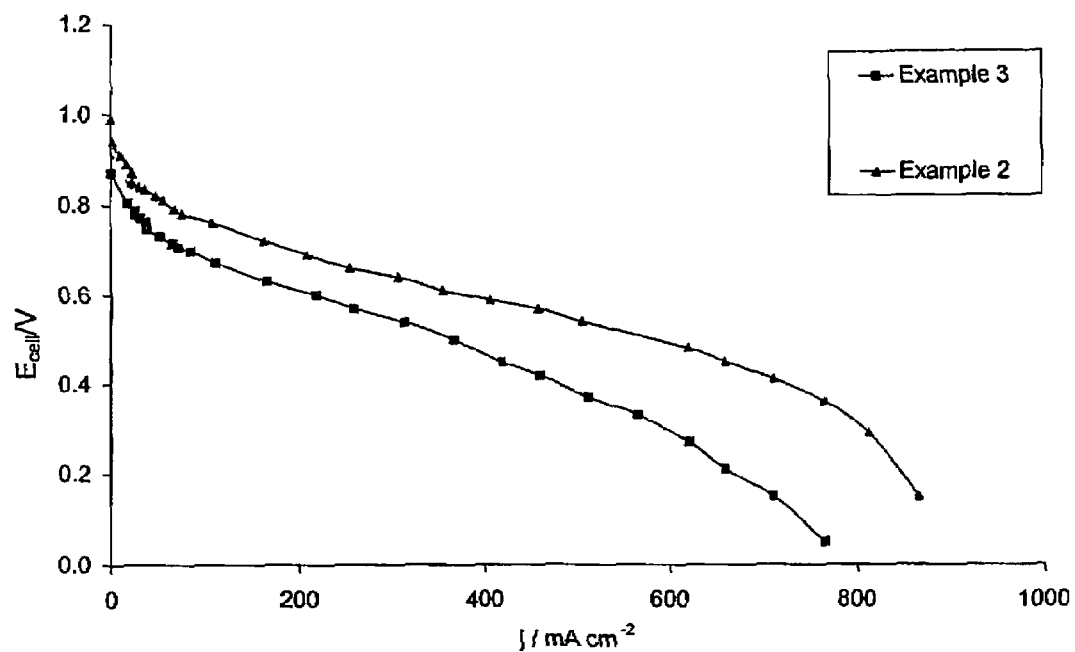
FIG. 2 shows polarization curves in H$_2$/air fuel cell at 30° C. of the MEA according to the invention and of an all-Nafion® based one.

The recorded polarization curve is shown in FIG. 2.

Example 3

Nafion®-Based MEA and its Performance in $H_2$/Air Fuel Cell a) MEA Configuration
Nafion® 115 (Dupont) electrolyte membrane
Nafion® 115 E-TEK$^{SM}$ (De Nora) commercial electrodes b) Electrode Configuration The electrode consisted of an electrocatalyst layer composed of 20 wt % Pt on Vulcan XC-72 (E-TEK$^{SM}$) and 30 wt % PTFE (Aldrich) directly deposited on a 0.3 mm-thick wet-proof carbon paper (Toray TGPH090). A 5 wt % Nafion® solution (Aldrich) was sprayed on the catalyst layer and dried at 80° C. The final Pt and Nafion® content were 0.49 mg/cm² and 0.6 mg/cm², respectively.

c) MEA Preparation

A MEA was prepared using the same electrodes of step b) for both anode and cathode, and a 120 μm thick Nafion® electrolyte membrane.

The membrane was previously purified in 5% $H_2O_2$ solution at 80° C. for 1 hour followed by a treatment in 1M sulfuric acid for 2 hours.

The MEA was then prepared by hot pressing the electrodes and the Nafion® 115 membrane at 130° C. for 30 min applying 50 kg/cm² pressure.

The geometrical electrode area of the electrode/membrane assembly was 5 cm².

d) Electrochemical Characterization in $H_2$/Air Cell

The electrochemical performance of this MEA was done using the same experimental set-up described in example 2.

Table 2 summarizes the results of example 2 and 3.

TABLE 2

| Example | Membrane | Electrodes | OCV (V) | Rcell (mΩ/cm$^2$) |
|---|---|---|---|---|
| 2 | SPS | SPS | 0.998 | 0.14 |
| 3 | Nafion ® | Nafion ® | 0.910 | 0.22 |

These data show that MEA based on a sulfonated polysulfone polymer according to the invention performs better than a Nafion® all-based one.

The recorded polarization curve is shown in FIG. 2, too.

Example 4

Stability Test of an All Based SPS MEA in H$_2$/Air Cell at 60° C.

Another MEA was prepared according to example 2 using a 160 μm SPS electrolyte membrane.

In order to verify the time stability of this new MEA a potentiostatic time test was performed at 60° C. The cell potential was fixed at 0.4V and the variation of the delivered current was followed in time.

Figure 3:
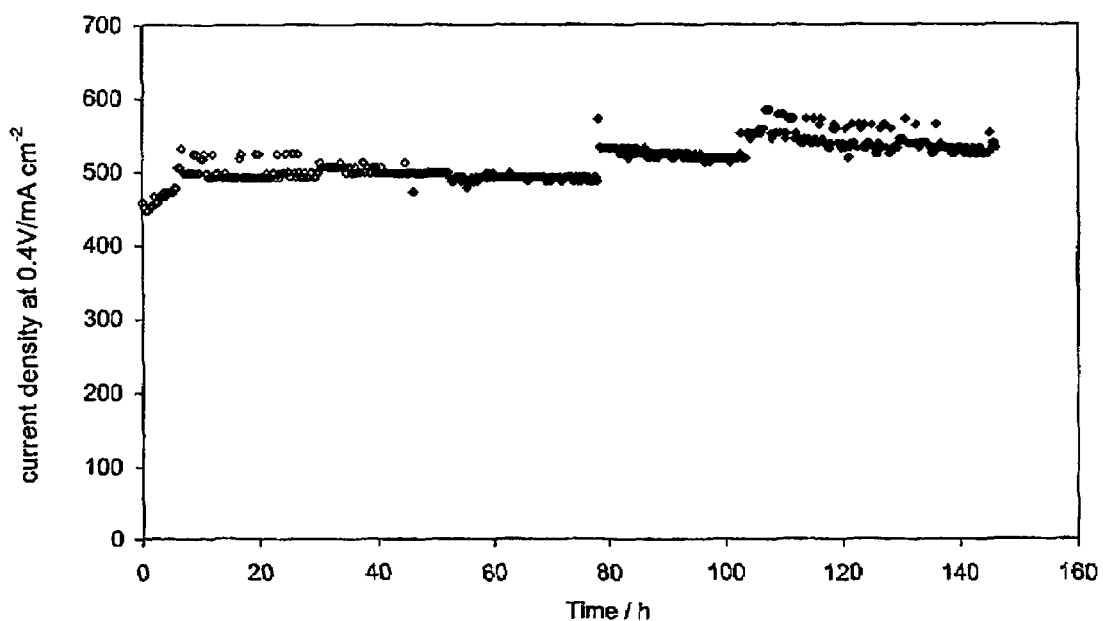
FIG. 3 shows time stability test of a fuel cell according to the invention.

FIG. 3 shows the measured current as function of time. The MEA of the invention has a very stable response in time.

The invention claimed is:

1. A fuel cell comprising a membrane-electrode assembly comprising:
   (a) an anode;
   (b) a cathode; and
   (c) a polymer electrolyte membrane interposed between the anode and the cathode,
   said polymer electrolyte membrane comprising a sulfonated polysulfone polymer having the following repeating units:

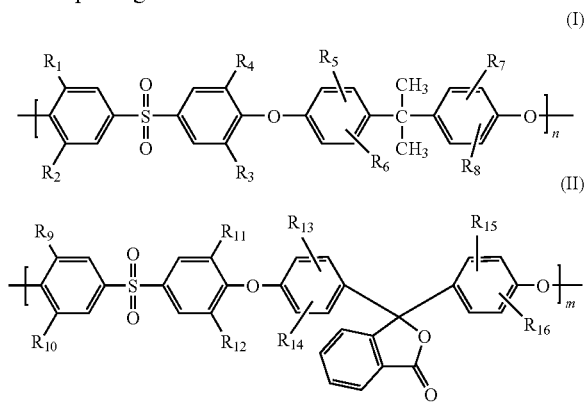

wherein
R$_1$-R$_{16}$ are independently hydrogen, a SO$_3$H group, a methyl group, an ethyl group or an optionally branched (C$_{3-6}$)alkyl group, with the proviso that at least one of R$_1$-R$_{16}$ is a SO$_3$H group;
n+m is an integer from 10 to 1,000 inclusive;
n is an integer from 0 to 999 inclusive; and
m is an integer from 1 to 1,000 inclusive,
and salts thereof.

2. The fuel cell according to claim 1, wherein at least one of R$_{13}$-R$_{16}$ is a SO$_3$H group.

3. The fuel cell according to claim 1, wherein R$_1$-R$_4$ and R$_9$-R$_{12}$ is hydrogen.

4. The fuel cell according to claim 2, wherein at least one of R$_5$-R$_8$ and R$_{13}$-R$_{16}$ is SO$_3$H.

5. The fuel cell according to claim 1, wherein said polymer electrolyte membrane comprises on a sulfonated polysulfone polymer having the following repeating units:

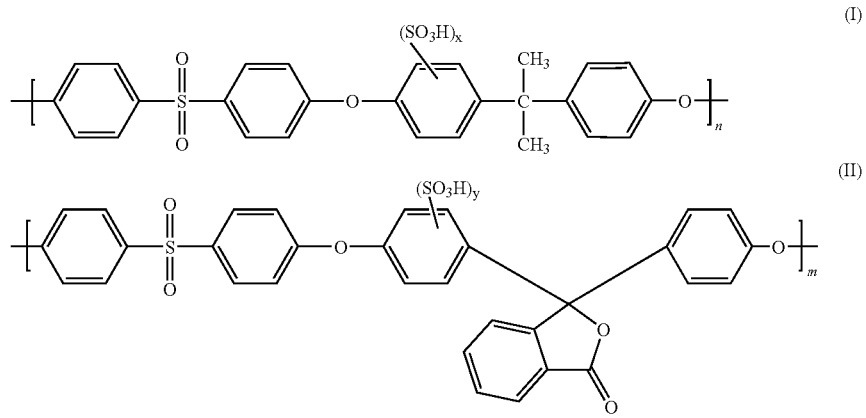

Wherein x+y is 1 and n=m.

6. The fuel cell according to claim 1, wherein said polymer has a sulfonic content of about 0.5-3.5 meq/g.

7. The fuel cell according to claim 5, wherein said polymer has a sulfonic content of about 0.7-2.3 meq/g.

8. The fuel cell according to claim 6, wherein said polymer has a sulfonic content of about 0.8-1.3 meq/g.

9. The fuel cell according to claim 1, wherein the polymer is amorphous.

10. The Fuel cell according to claim 1, wherein the cathode and/or the anode comprises a sulfonated polysulfone.

11. The fuel cell according to claim 1, wherein the cathode and/or the anode comprises a sulfonated polysulfone polymer having the repeating units of claim 1.

12. The fuel cell according to claim 1, comprising a hydrogen fuel cell.

13. A membrane-electrode assembly comprising:
   (a) an anode;
   (b) a cathode; and
   (c) a polymer electrolyte membrane interposed between the anode and the cathode,
   said polymer electrolyte membrane comprising a sulfonated polysulfone polymer having the repeating units:

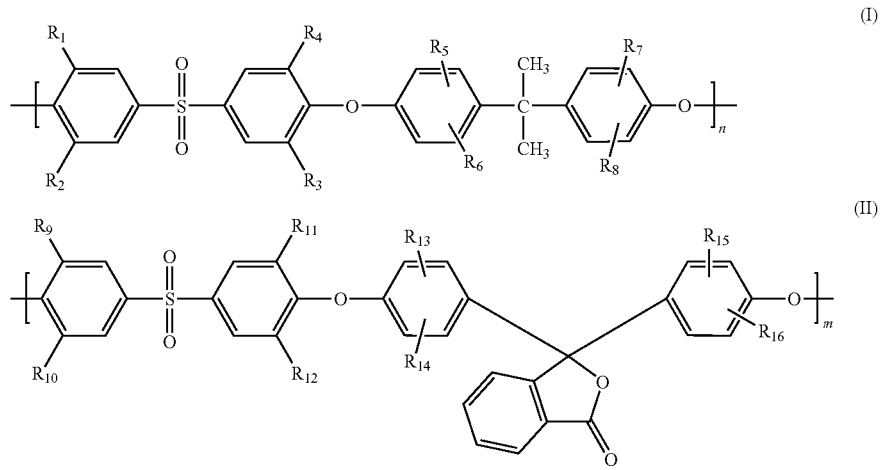

wherein
R$_1$-R$_{16}$ are independently hydrogen, a SO$_3$H group, a methyl group, an ethyl group or an optionally branched (C$_{3-6}$)alkyl group, with the proviso that at least one of R$_1$-R$_{16}$ is a SO$_3$H group;
n+m is an integer from 10 to 1,000 inclusive;
n is an integer from 0 to 999 inclusive; and
m is an integer from 1 to 1,000 inclusive,
and salts thereof.

14. An apparatus powered by the fuel cell of any one of claims 1 to 12.

15. The apparatus according to claim 14, comprising an engine for vehicle transportation, a power supply unit or an electronic portable device.

* * * * *